United States Patent [19]
Schieve

[11] Patent Number: 5,668,980
[45] Date of Patent: Sep. 16, 1997

[54] SYSTEM FOR PERFORMING ROTATION OF PIXEL MATRICES

[75] Inventor: Eric W. Schieve, Austin, Tex.

[73] Assignee: Advanced Micro Devices, Inc., Sunnyvale, Calif.

[21] Appl. No.: 509,487

[22] Filed: Jul. 31, 1995

[51] Int. Cl.$^6$ .................................................. G06F 13/00
[52] U.S. Cl. ........................ 345/523; 345/437; 345/501; 345/126
[58] Field of Search ...................... 395/118, 133, 395/137, 501, 523; 345/121, 126

[56] References Cited

U.S. PATENT DOCUMENTS

| | | | |
|---|---|---|---|
| 5,111,192 | 5/1992 | Kadakia ................................ | 345/126 |
| 5,361,339 | 11/1994 | Kadakia et al. ................... | 395/421.01 |
| 5,365,601 | 11/1994 | Kadakia et al. ................... | 382/297 |

Primary Examiner—Kee M. Tung
Assistant Examiner—U. Chauhan
Attorney, Agent, or Firm—Skjerven, Morrill, MacPherson, Franklin & Friel, L.L.P.; Stephen A. Terrile

[57] ABSTRACT

The invention relates to a method for rotating a source pixel matrix to provide a rotated destination matrix. The method operates on a computer system which includes a processor, a memory and a temporary storage portion. The temporary storage portion includes a plurality of rows where each row includes a plurality of storage locations. The method includes the steps of loading a first set of rows of the temporary storage portion with a lower portion of the source pixel matrix, loading a second set of rows of the temporary storage portion with an upper portion of the source pixel matrix, skewing the source pixel matrix loaded in first and second sets of rows to provide a skewed pixel matrix, alternately rotating selected portions of the skewed pixel matrix stored in selected rows of the first and second sets of rows horizontally and vertically to provide a rotated pixel matrix, and unscrambling the rotated pixel matrix to provide the rotated destination matrix.

20 Claims, 10 Drawing Sheets

| 33 | 34 | 35 | 36 | 37 | 38 | 39 | 40 | AH | AL | 1 | 2 | 3 | 4 | 5 | 6 | 7 | 8 |
| 41 | 42 | 43 | 44 | 45 | 46 | 47 | 48 | BH | BL | 9 | 10 | 11 | 12 | 13 | 14 | 15 | 16 |
| 49 | 50 | 51 | 52 | 53 | 54 | 55 | 56 | CH | CL | 17 | 18 | 19 | 20 | 21 | 22 | 23 | 24 |
| 57 | 58 | 59 | 60 | 61 | 62 | 63 | 64 | DH | DL | 25 | 26 | 27 | 28 | 29 | 30 | 31 | 32 |

FIG. 3

| 57 | 58 | 59 | 60 | 61 | 62 | 63 | 64 | AH | AL | 1 | 2 | 3 | 4 | 5 | 6 | 7 | 8 |
| 49 | 50 | 51 | 52 | 53 | 54 | 55 | 56 | BH | BL | 9 | 10 | 11 | 12 | 13 | 14 | 15 | 16 |
| 41 | 42 | 43 | 44 | 45 | 46 | 47 | 48 | CH | CL | 17 | 18 | 19 | 20 | 21 | 22 | 23 | 24 |
| 33 | 34 | 35 | 36 | 37 | 38 | 39 | 40 | DH | DL | 25 | 26 | 27 | 28 | 29 | 30 | 31 | 32 |

FIG. 4

| 62 | 63 | 64 | 57 | 58 | 59 | 60 | 61 | AH | AL | 4 | 5 | 6 | 7 | 8 | 1 | 2 | 3 |
| 55 | 56 | 49 | 50 | 51 | 52 | 53 | 54 | BH | BL | 11 | 12 | 13 | 14 | 15 | 16 | 9 | 10 |
| 48 | 41 | 42 | 43 | 44 | 45 | 46 | 47 | CH | CL | 18 | 19 | 20 | 21 | 22 | 23 | 24 | 17 |
| 33 | 34 | 35 | 36 | 37 | 38 | 39 | 40 | DH | DL | 25 | 26 | 27 | 28 | 29 | 30 | 31 | 32 |

FIG. 5

| 63 | 64 | 57 | 58 | 59 | 60 | 61 | 4 | AH | AL | 5 | 6 | 7 | 8 | 1 | 2 | 3 | 62 |
|---|---|---|---|---|---|---|---|---|---|---|---|---|---|---|---|---|---|
| 56 | 49 | 50 | 51 | 52 | 53 | 54 | 11 | BH | BL | 12 | 13 | 14 | 15 | 16 | 9 | 10 | 55 |
| 41 | 42 | 43 | 44 | 45 | 46 | 47 | 18 | CH | CL | 19 | 20 | 21 | 22 | 23 | 24 | 17 | 48 |
| 34 | 35 | 36 | 37 | 38 | 39 | 40 | 25 | DH | DL | 26 | 27 | 28 | 29 | 30 | 31 | 32 | 33 |

FIG. 6A

| 63 | 64 | 57 | 58 | 59 | 60 | 61 | 4 | AH | AL | 12 | 13 | 14 | 15 | 16 | 9 | 10 | 55 |
|---|---|---|---|---|---|---|---|---|---|---|---|---|---|---|---|---|---|
| 56 | 49 | 50 | 51 | 52 | 53 | 54 | 11 | BH | BL | 19 | 20 | 21 | 22 | 23 | 24 | 17 | 48 |
| 41 | 42 | 43 | 44 | 45 | 46 | 47 | 18 | CH | CL | 26 | 27 | 28 | 29 | 30 | 31 | 32 | 33 |
| 34 | 35 | 36 | 37 | 38 | 39 | 40 | 25 | DH | DL | 5 | 6 | 7 | 8 | 1 | 2 | 3 | 62 |

FIG. 6B

| 64 | 57 | 58 | 59 | 60 | 61 | 4 | 12 | AH | AL | 13 | 14 | 15 | 16 | 9 | 10 | 55 | 63 |
|---|---|---|---|---|---|---|---|---|---|---|---|---|---|---|---|---|---|
| 49 | 50 | 51 | 52 | 53 | 54 | 11 | 19 | BH | BL | 20 | 21 | 22 | 23 | 24 | 17 | 48 | 56 |
| 42 | 43 | 44 | 45 | 46 | 47 | 18 | 26 | CH | CL | 27 | 28 | 29 | 30 | 31 | 32 | 33 | 41 |
| 35 | 36 | 37 | 38 | 39 | 40 | 25 | 5 | DH | DL | 6 | 7 | 8 | 1 | 2 | 3 | 62 | 34 |

FIG. 6C

| 64 | 57 | 58 | 59 | 60 | 61 | 4  | 12 | AH | AL | 20 | 21 | 22 | 23 | 24 | 17 | 48 | 56 |
|----|----|----|----|----|----|----|----|----|----|----|----|----|----|----|----|----|----|
| 49 | 50 | 51 | 52 | 53 | 54 | 11 | 19 | BH | BL | 27 | 28 | 29 | 30 | 31 | 32 | 33 | 41 |
| 42 | 43 | 44 | 45 | 46 | 47 | 18 | 26 | CH | CL | 6  | 7  | 8  | 1  | 2  | 3  | 62 | 34 |
| 35 | 36 | 37 | 38 | 39 | 40 | 25 | 5  | DH | DL | 13 | 14 | 15 | 16 | 9  | 10 | 55 | 63 |

FIG. 6D

| 57 | 58 | 59 | 60 | 61 | 4  | 12 | 20 | AH | AL | 21 | 22 | 23 | 24 | 17 | 48 | 56 | 64 |
|----|----|----|----|----|----|----|----|----|----|----|----|----|----|----|----|----|----|
| 50 | 51 | 52 | 53 | 54 | 11 | 19 | 27 | BH | BL | 28 | 29 | 30 | 31 | 32 | 33 | 41 | 49 |
| 43 | 44 | 45 | 46 | 47 | 18 | 26 | 6  | CH | CL | 7  | 8  | 1  | 2  | 3  | 62 | 34 | 42 |
| 36 | 37 | 38 | 39 | 40 | 25 | 5  | 13 | DH | DL | 14 | 15 | 16 | 9  | 10 | 55 | 63 | 35 |

FIG. 6E

| 57 | 58 | 59 | 60 | 61 | 4  | 12 | 20 | AH | AL | 28 | 29 | 30 | 31 | 32 | 33 | 41 | 49 |
|----|----|----|----|----|----|----|----|----|----|----|----|----|----|----|----|----|----|
| 50 | 51 | 52 | 53 | 54 | 11 | 19 | 27 | BH | BL | 7  | 8  | 1  | 2  | 3  | 62 | 34 | 42 |
| 43 | 44 | 45 | 46 | 47 | 18 | 26 | 6  | CH | CL | 14 | 15 | 16 | 9  | 10 | 55 | 63 | 35 |
| 36 | 37 | 38 | 39 | 40 | 25 | 5  | 13 | DH | DL | 21 | 22 | 23 | 24 | 17 | 48 | 56 | 64 |

FIG. 6F

| 58 | 59 | 60 | 61 | 4 | 12 | 20 | 28 |
|---|---|---|---|---|---|---|---|
| 51 | 52 | 53 | 54 | 11 | 19 | 27 | 7 |
| 44 | 45 | 46 | 47 | 18 | 26 | 6 | 14 |
| 37 | 38 | 39 | 40 | 25 | 5 | 13 | 21 |

AH AL
BH BL
CH CL
DH DL

| 29 | 30 | 31 | 32 | 33 | 41 | 49 | 57 |
|---|---|---|---|---|---|---|---|
| 8 | 1 | 2 | 3 | 62 | 34 | 42 | 50 |
| 15 | 16 | 9 | 10 | 55 | 63 | 35 | 43 |
| 22 | 23 | 24 | 17 | 48 | 56 | 64 | 36 |

FIG. 6G

| 58 | 59 | 60 | 61 | 4 | 12 | 20 | 28 |
|---|---|---|---|---|---|---|---|
| 51 | 52 | 53 | 54 | 11 | 19 | 27 | 7 |
| 44 | 45 | 46 | 47 | 18 | 26 | 6 | 14 |
| 37 | 38 | 39 | 40 | 25 | 5 | 13 | 21 |

AH AL
BH BL
CH CL
DH DL

| 8 | 1 | 2 | 3 | 62 | 34 | 42 | 50 |
|---|---|---|---|---|---|---|---|
| 15 | 16 | 9 | 10 | 55 | 63 | 35 | 43 |
| 22 | 23 | 24 | 17 | 48 | 56 | 64 | 36 |
| 29 | 30 | 31 | 32 | 33 | 41 | 49 | 57 |

FIG. 6H

| 59 | 60 | 61 | 4 | 12 | 20 | 28 | 8 |
|---|---|---|---|---|---|---|---|
| 52 | 53 | 54 | 11 | 19 | 27 | 7 | 15 |
| 45 | 46 | 47 | 18 | 26 | 6 | 14 | 22 |
| 38 | 39 | 40 | 25 | 5 | 13 | 21 | 29 |

AH AL
BH BL
CH CL
DH DL

| 1 | 2 | 3 | 62 | 34 | 42 | 50 | 58 |
|---|---|---|---|---|---|---|---|
| 16 | 9 | 10 | 55 | 63 | 35 | 43 | 51 |
| 23 | 24 | 17 | 48 | 56 | 64 | 36 | 44 |
| 30 | 31 | 32 | 33 | 41 | 49 | 57 | 37 |

FIG. 6I

| 59 | 60 | 61 | 4 | 12 | 20 | 28 | 8 |
|----|----|----|----|----|----|----|----|
| 52 | 53 | 54 | 11 | 19 | 27 | 7 | 15 |
| 45 | 46 | 47 | 18 | 26 | 6 | 14 | 22 |
| 38 | 39 | 40 | 25 | 5 | 13 | 21 | 29 |

AH
BH
CH
DH

AL
BL
CL
DL

| 16 | 9 | 10 | 55 | 63 | 35 | 43 | 51 |
|----|---|----|----|----|----|----|----|
| 23 | 24 | 17 | 48 | 56 | 64 | 36 | 44 |
| 30 | 31 | 32 | 33 | 41 | 49 | 57 | 37 |
| 1 | 2 | 3 | 62 | 34 | 42 | 50 | 58 |

FIG. 6J

| 60 | 61 | 4 | 12 | 20 | 28 | 8 | 16 |
|----|----|----|----|----|----|----|----|
| 53 | 54 | 11 | 19 | 27 | 7 | 15 | 23 |
| 46 | 47 | 18 | 26 | 6 | 14 | 22 | 30 |
| 39 | 40 | 25 | 5 | 13 | 21 | 29 | 1 |

AH
BH
CH
DH

AL
BL
CL
DL

| 9 | 10 | 55 | 63 | 35 | 43 | 51 | 59 |
|---|----|----|----|----|----|----|----|
| 24 | 17 | 48 | 56 | 64 | 36 | 44 | 52 |
| 31 | 32 | 33 | 41 | 49 | 57 | 37 | 45 |
| 2 | 3 | 62 | 34 | 42 | 50 | 58 | 38 |

FIG. 6K

| 60 | 61 | 4 | 12 | 20 | 28 | 8 | 16 |
|----|----|----|----|----|----|----|----|
| 53 | 54 | 11 | 19 | 27 | 7 | 15 | 23 |
| 46 | 47 | 18 | 26 | 6 | 14 | 22 | 30 |
| 39 | 40 | 25 | 5 | 13 | 21 | 29 | 1 |

AH
BH
CH
DH

AL
BL
CL
DL

| 24 | 17 | 48 | 56 | 64 | 36 | 44 | 52 |
|----|----|----|----|----|----|----|----|
| 31 | 32 | 33 | 41 | 49 | 57 | 37 | 45 |
| 2 | 3 | 62 | 34 | 42 | 50 | 58 | 38 |
| 9 | 10 | 55 | 63 | 35 | 43 | 51 | 59 |

FIG. 6L

| 61 | 4 | 12 | 20 | 28 | 8 | 16 | 24 | AH | AL | 17 | 48 | 56 | 64 | 36 | 44 | 52 | 60 |
|---|---|---|---|---|---|---|---|---|---|---|---|---|---|---|---|---|---|
| 54 | 11 | 19 | 27 | 7 | 15 | 23 | 31 | BH | BL | 32 | 33 | 41 | 49 | 57 | 37 | 45 | 53 |
| 47 | 18 | 26 | 6 | 14 | 22 | 30 | 2 | CH | CL | 3 | 62 | 34 | 42 | 50 | 58 | 38 | 46 |
| 40 | 25 | 5 | 13 | 21 | 29 | 1 | 9 | DH | DL | 10 | 55 | 63 | 35 | 43 | 51 | 59 | 39 |

FIG. 6M

| 61 | 4 | 12 | 20 | 28 | 8 | 16 | 24 | AH | AL | 32 | 33 | 41 | 49 | 57 | 37 | 45 | 53 |
|---|---|---|---|---|---|---|---|---|---|---|---|---|---|---|---|---|---|
| 54 | 11 | 19 | 27 | 7 | 15 | 23 | 31 | BH | BL | 3 | 62 | 34 | 42 | 50 | 58 | 38 | 46 |
| 47 | 18 | 26 | 6 | 14 | 22 | 30 | 2 | CH | CL | 10 | 55 | 63 | 35 | 43 | 51 | 59 | 39 |
| 40 | 25 | 5 | 13 | 21 | 29 | 1 | 9 | DH | DL | 17 | 48 | 56 | 64 | 36 | 44 | 52 | 60 |

FIG. 6N

| 4 | 12 | 20 | 28 | 8 | 16 | 24 | 32 | AH | AL | 33 | 41 | 49 | 57 | 37 | 45 | 53 | 61 |
|---|---|---|---|---|---|---|---|---|---|---|---|---|---|---|---|---|---|
| 11 | 19 | 27 | 7 | 15 | 23 | 31 | 3 | BH | BL | 62 | 34 | 42 | 50 | 58 | 38 | 46 | 54 |
| 18 | 26 | 6 | 14 | 22 | 30 | 2 | 10 | CH | CL | 55 | 63 | 35 | 43 | 51 | 59 | 39 | 47 |
| 25 | 5 | 13 | 21 | 29 | 1 | 9 | 17 | DH | DL | 48 | 56 | 64 | 36 | 44 | 52 | 60 | 40 |

FIG. 6O

| 25 | 5  | 13 | 21 | 29 | 1  | 9  | 17 |
|----|----|----|----|----|----|----|----|
| 18 | 26 | 6  | 14 | 22 | 30 | 2  | 10 |
| 11 | 19 | 27 | 7  | 15 | 23 | 31 | 3  |
| 4  | 12 | 20 | 28 | 8  | 16 | 24 | 32 |

AH
BH
CH
DH

AL
BL
CL
DL

| 33 | 41 | 49 | 57 | 37 | 45 | 53 | 61 |
|----|----|----|----|----|----|----|----|
| 62 | 34 | 42 | 50 | 58 | 38 | 46 | 54 |
| 55 | 63 | 35 | 43 | 51 | 59 | 39 | 47 |
| 48 | 56 | 64 | 36 | 44 | 52 | 60 | 40 |

FIG. 7

| 1  | 9  | 17 | 25 | 33 | 41 | 49 | 57 |
|----|----|----|----|----|----|----|----|
| 18 | 26 | 6  | 14 | 22 | 30 | 2  | 10 |
| 11 | 19 | 27 | 7  | 15 | 23 | 31 | 3  |
| 4  | 12 | 20 | 28 | 8  | 16 | 24 | 32 |

AH
BH
CH
DH

AL
BL
CL
DL

| 5  | 13 | 21 | 29 | 37 | 45 | 53 | 61 |
|----|----|----|----|----|----|----|----|
| 62 | 34 | 42 | 50 | 58 | 38 | 46 | 54 |
| 55 | 63 | 35 | 43 | 51 | 59 | 39 | 47 |
| 48 | 56 | 64 | 36 | 44 | 52 | 60 | 40 |

FIG. 8A

| 1  | 9  | 17 | 25 | 33 | 41 | 49 | 57 |
|----|----|----|----|----|----|----|----|
| 6  | 14 | 22 | 30 | 38 | 46 | 54 | 62 |
| 11 | 19 | 27 | 7  | 15 | 23 | 31 | 3  |
| 4  | 12 | 20 | 28 | 8  | 16 | 24 | 32 |

AH
BH
CH
DH

AL
BL
CL
DL

| 5  | 13 | 21 | 29 | 37 | 45 | 53 | 61 |
|----|----|----|----|----|----|----|----|
| 2  | 10 | 18 | 26 | 34 | 42 | 50 | 58 |
| 55 | 63 | 35 | 43 | 51 | 59 | 39 | 47 |
| 48 | 56 | 64 | 36 | 44 | 52 | 60 | 40 |

FIG. 8B

| 1 | 9 | 17 | 25 | 33 | 41 | 49 | 57 |
|---|---|----|----|----|----|----|----|
| 6 | 14 | 22 | 30 | 38 | 46 | 54 | 62 |
| 7 | 15 | 23 | 31 | 39 | 47 | 55 | 63 |
| 4 | 12 | 20 | 28 | 8 | 16 | 24 | 32 |

AH AL

| 5 | 13 | 21 | 29 | 37 | 45 | 53 | 61 |
|---|----|----|----|----|----|----|----|
| 2 | 10 | 18 | 26 | 34 | 42 | 50 | 58 |
| 3 | 11 | 19 | 27 | 35 | 43 | 51 | 59 |
| 48 | 56 | 64 | 36 | 44 | 52 | 60 | 40 |

| 1 | 9 | 17 | 25 | 33 | 41 | 49 | 57 |
|---|---|----|----|----|----|----|----|
| 6 | 14 | 22 | 30 | 38 | 46 | 54 | 62 |
| 7 | 15 | 23 | 31 | 39 | 47 | 55 | 63 |
| 8 | 16 | 20 | 32 | 8 | 48 | 56 | 64 |

AH AL

| 5 | 13 | 21 | 29 | 37 | 45 | 53 | 61 |
|---|----|----|----|----|----|----|----|
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |

SYSTEM FOR PERFORMING ROTATION OF PIXEL MATRICES

BACKGROUND OF THE INVENTION

The present invention relates to pixel matrices and more particularly to a system for performing rotation of pixel matrices.

Video image rotation is a common requirement in, for example, handheld computer systems. Image rotation is required in handheld computer systems because these handheld computer systems often include video displays, e.g., liquid crystal display (LCD) type displays, which may be physically mounted within the handheld computer system such that the raster scanlines of the display are oriented vertically with respect to the user. Video controllers scan images from memory such that each raster scanline on the display is represented within a contiguous array of memory locations. Graphics software typically draws images into video memory so that image rows are parallel to the scanning direction of the video controller, i.e., an image row is represented as a contiguous array of memory locations. If the display is oriented with vertical raster lines, then an image which is stored in video memory appears rotated by 90 degrees.

Compensating for displays having this orientation is known in the art. For example, high level software applications can be modified specifically for the system so as to transform the coordinate system from the source image as it is written. Such a modification precludes the use of off the shelf graphics software. Another software solution is to modify the display device driver to perform the system specific coordinate transformations. However, in many systems such as the Windows operating environment, the display device driver is standard and unmodifiable. Another solution is to implement image rotations in the video controller hardware. However, this solution adds additional cost to those systems which include a vertically oriented display. Another solution is to provide an operating system with a background process of rotating the image into video memory. However, this solution presents the requirement that the system for rotating the image must be efficient so that the rotation is performed quickly.

SUMMARY OF THE INVENTION

The present invention relates to a system which efficiently performs a video image rotation by geometric means. More specifically, in a preferred embodiment, the invention relates to a method for rotating a source pixel matrix to provide a rotated destination matrix. The method operates on a computer system which includes a processor, a memory and a temporary storage portion. The temporary storage portion includes a plurality of rows where each row includes a plurality of storage locations. The method includes the steps of loading a first set of rows of the temporary storage portion with a lower portion of the source pixel matrix, loading a second set of rows of the temporary storage portion with an upper portion of the source pixel matrix, skewing the source pixel matrix loaded in first and second sets of rows to provide a skewed pixel matrix, alternately rotating selected portions of the skewed pixel matrix stored in selected rows of the first and second sets of rows horizontally and vertically to provide a rotated pixel matrix, and unscrambling the rotated pixel matrix to provide the rotated destination matrix.

BRIEF DESCRIPTION OF THE DRAWINGS

FIG. 3 shows an example of the contents of registers during a load portion of the operation of the system of FIG. 1.

FIG. 4 shows an example of the contents of the registers during a reorder portion of the operation of the system of FIG. 1.

FIG. 5 shows an example of the contents of the registers during a skew portion of the operation of the system of FIG. 1.

FIGS. 6A–6O show examples of the contents of the registers during a rotate portion of the operation of the system of FIG. 1.

FIG. 7 shows an example of the contents of the registers during an exchange portion of the operation of the system of FIG. 1.

FIGS. 8A–8D show examples of the contents of the registers during an unscramble portion of the operation of the system of FIG. 1.

DETAILED DESCRIPTION

The following sets forth a detailed description of the best contemplated mode for carrying out the invention. The description is intended to be illustrative of the invention and should not be taken to be limiting.

Figure 1:
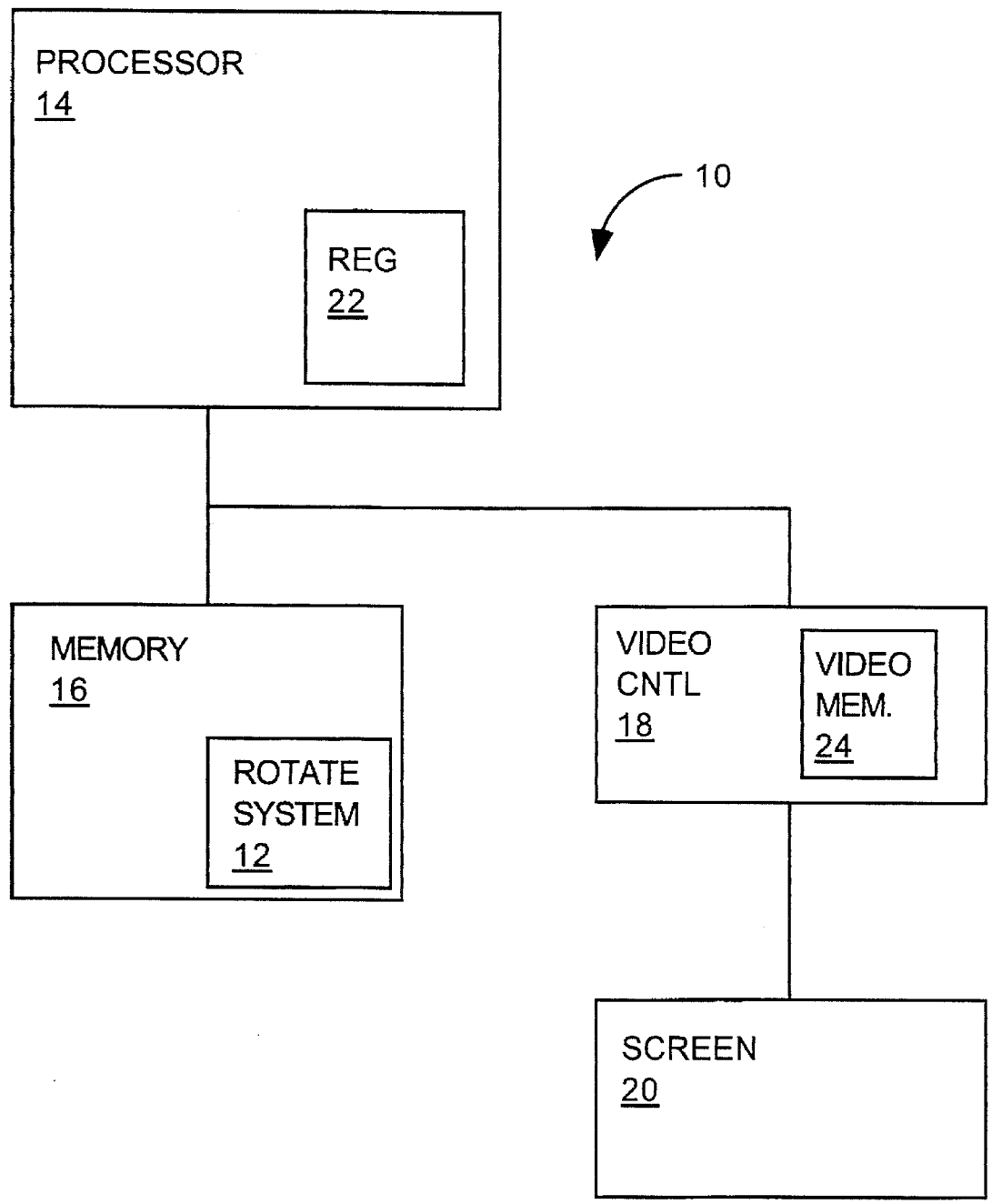
FIG. 1 shows a schematic block diagram of a handheld device including a system for performing video image rotation in accordance with the present invention.

Referring to FIG. 1, a schematic block diagram of a handheld device 10 including rotate system 12 for performing video image rotation in accordance with the present invention is shown. More specifically, handheld device 10 includes processor 14, which is coupled to memory 16 and video controller 18. Video controller 18 is further coupled to screen 20, which is, for example, a liquid crystal display (LCD) type of screen. Processor 14 is, for example, a processor conforming to the X86 architecture, such as the processor available from Advanced Micro Devices under the trade designation AM 386 SXLV. Processor 14 includes register portion 22 which includes a standard X86 register set as is known in the art. Register portion 22 includes a plurality of rows, where each row includes a plurality of storage locations. Memory 16 includes non-volatile computer readable memory on which rotate system 12 is stored. Video controller 18 includes video memory 24 which stores video information relating to the pixels to be displayed on screen 20.

In operation, rotate system 12 is executed by processor 14 to rotate a source matrix of pixel data to provide a rotated destination matrix of pixel data. When executing rotate system 12, processor 14 interacts with register portion 22 and ultimately writes the rotated destination matrix to video memory 24.

Figure 2:
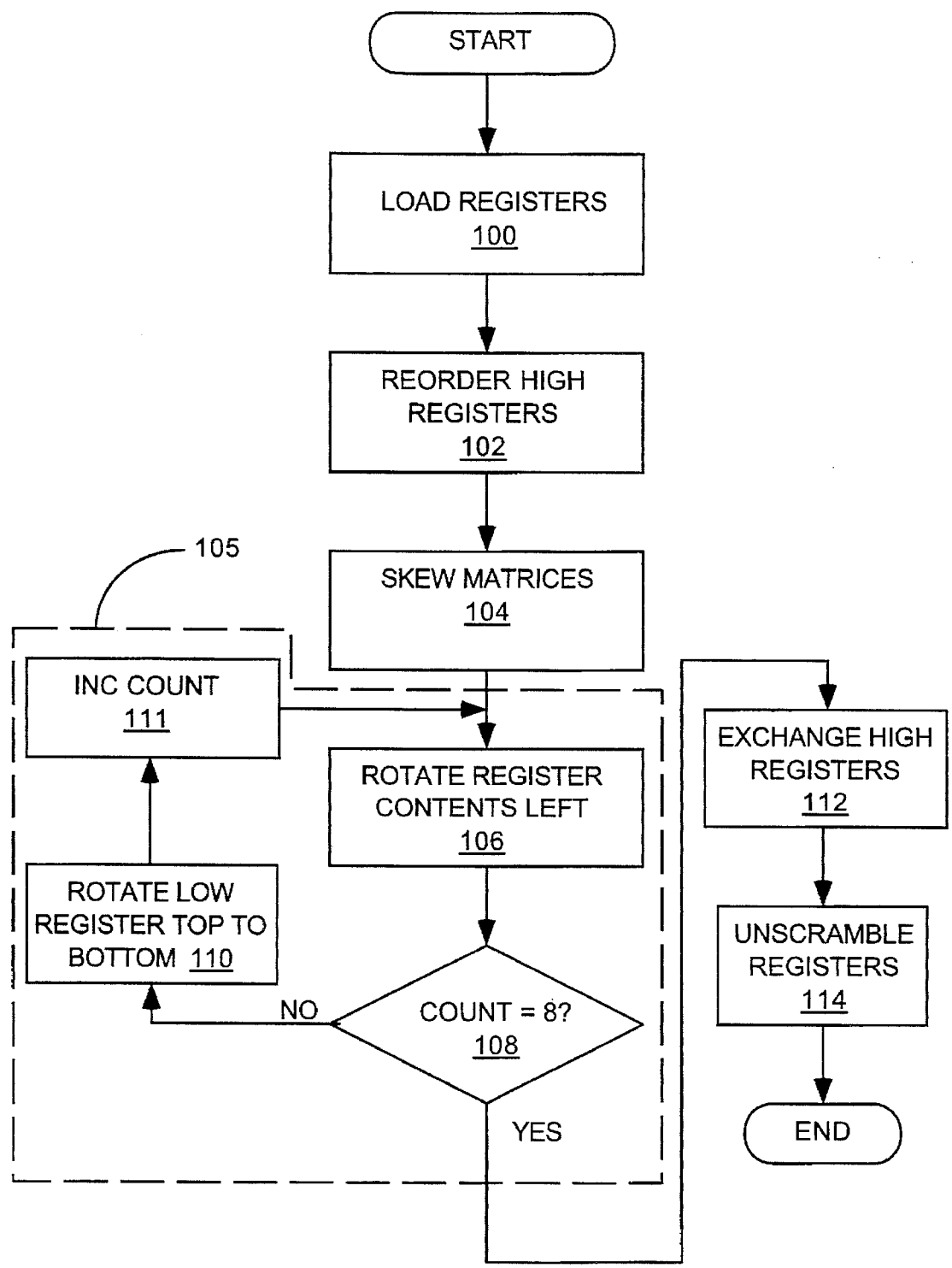
FIG. 2 shows a flow chart of the operation of the system for performing video image rotation of FIG. 1.

Referring to FIG. 2, a flow chart of the operation of rotate system 12 for performing video image rotation is shown. More specifically, referring to FIGS. 2 and 3, the system for performing video image rotation starts by loading four 16-bit registers with an 8×8 matrix of pixels, where each pixel is stored as a single bit. The four registers are identified as either A, B, C or D. The four 16-bit registers are conceptually divided into eight 8-bit registers, each 8-bit register being either a high byte or low byte register of one of the 16-bit registers. Accordingly, each byte is accessed by identifying the register (i.e., A, B, C, or D) as well as the byte within the register (i.e., H or L). For operations which are performed on both bytes of the register, the byte identifier is identified as "X".

During load step 100, the first four rows, i.e., the lower 32-bits, of the 8×8 matrix are loaded into the low bytes of the registers. I.e., the first four rows of the matrix are loaded into registers AL, BL, CL, and DL, respectively. The last four rows, i.e., the upper 32-bits, of the 8×8 matrix are loaded into the high bytes of the registers. I.e., the last 32-bits are loaded into registers AH, BH, CH, and DH, respectively. After the registers are loaded with the 8×8 matrix, control transfers to reorder step 102.

Referring to FIGS. 2 and 4, during reorder step 102, the contents of the high registers AH–DH are reordered to facilitate unscrambling of nibbles of pixels which form the rotated destination matrix. More specifically, the contents of register AH is swapped with the contents of register DH and the contents of register BH is swapped with the contents of register CH. This function is accomplished, e.g., by causing processor 14 to execute the following assembly language instructions.

XCHG AH,DH
XCHG BH,CH

After the contents of the high registers are reordered, control transfers to skew step 104.

Referring to FIGS. 2 and 5, during skew step 104, the contents of the high registers are skewed clockwise and the contents of the low registers are skewed counter clockwise. More specifically, the contents of register AH are rotated right 3 bits, the contents of register BH are rotated right 2 bits and the contents of register CH are rotated right 1 bit. Additionally, the contents of register AL are rotated left 3 bits, the contents of register BL are rotated left 2 bits and the contents of register CL are rotated left 1 bit. These functions are accomplished, e.g., by causing processor 14 to execute the following assembly language instructions.

ROR AH,3
ROR BH,2
ROR CH,1

ROL AL,3
ROL BL,2
ROL CL,1

After the contents of the registers are appropriately skewed, control transfers to rotate portion 105, and more particularly to rotate register contents left step 106.

Referring to FIGS. 2 and 6A–6O, rotate portion 105 alternately rotates rows of registers AX–DX horizontally, and more specifically left, and rotates rows of registers AL–DL vertically, and more specifically top to bottom.

More specifically to FIG. 6A, rotate register contents left step 106 rotates the contents of each of the registers left one location and circularly rotates the contents of the most significant bit location to the least significant bit location. For the purposes of the rotate register contents left step 106, registers A–D are treated as 16 bit registers. I.e., the contents of the most significant bit location of the low portion of the register is rotated to the least significant bit location of the high portion of the register. The rotate left function is accomplished, e.g., by causing processor 14 to execute the following assembly language instructions.

ROL AX,1
ROL BX,1
ROL CX,1
ROL DX,1

After the contents of the registers are rotated left one location, control transfers to count check step 108.

During count check step 108, a count, which is initialized to 1 when the rotate system begins execution, is checked to determine whether the count equals eight. Eight rotations are performed based upon a width of the pixel matrices of eight. If the count does not equal eight, then control transfers to rotate low register step 110.

Referring to FIGS. 2 and 6B, during rotate low register step 110, the contents of the low registers AL–DL are rotated top to bottom. I.e., the contents of registers BL–DL are moved up one register to AL–CL, respectively. Additionally, the contents of the AL register are circularly rotated to the lower most register. I.e., the contents of register AL are moved to the DL register. The rotate top to bottom function is accomplished, e.g., by causing processor 14 to execute the following assembly language instructions.

XCHG AL,BL
XCHG BL,CL
XCHG CL,DL

After the contents of the low registers are rotated top to bottom one location, control transfers to increment count check step 111, during which the count is incremented. After the count is incremented, control returns to rotate register contents left step 106. Control cycles through rotate register contents left step 106 and rotate low register top to bottom step 110 until the count equals eight. FIGS. 6C–6O show the contents of the registers as each rotate register contents left step 106 and each rotate low register top to bottom step 110 step is executed. When the count equals eight, control transfers to exchange high registers step 112.

Referring to FIGS. 2 and 7, during exchange high registers step 112, the contents of registers AH and DH are exchanged and the contents of registers BH and CH are exchanged. The exchange function exchanges nibbles so that two rows of pixels are in the same 16-bit register. The exchange function is accomplished, e.g., by causing processor 14 to execute the following assembly language instructions.

XCHG AH,DH
XCHG BH,CH

After the contents of the high registers are exchanged, control transfers to unscramble registers step 114. Because each 16-bit register contains a mixture of nibbles from two rows of the matrix, the each 16-bit register must be unscrambled.

Referring to FIGS. 2 and 8A, the contents of the high and low portions of register A are first unscrambled. More specifically, the contents of the high register AH are circularly rotated left one location. The contents of the entire register AX are rotated left four locations. The contents of the low register AL are rotated left four locations. After the contents are unscrambled register AH contains destination matrix row 7 and register AL contains destination matrix row 3. The unscrambling function compensates for nibbles from two different rows being located within each 8-bit register. The unscrambling of the A register is accomplished, e.g., by causing processor 14 to execute the following assembly language instructions.

```
ROL AH,1
ROL AX,4
ROL AL,4
```

After the contents of the A register are unscrambled, the unscramble register step unscrambles the B register. More specifically, referring to FIG. 8B, the contents of the high register BH are circularly rotated right two locations. The contents of the low register BL are circularly rotated right three locations. The contents of the entire register BX are rotated left four locations. The contents of the low register BL are lent rotated left four locations. After the contents are unscrambled register BH contains destination matrix row 2 and register BL contains destination matrix row 6. The unscrambling of the B register is accomplished, e.g., by causing processor 14 to execute the following assembly language instructions.

```
ROR BH,2
ROR BL,3
ROL BX,4
ROL BL,4
```

After the contents of the B register are unscrambled, the unscramble register step unscrambles the C register. More specifically, referring to FIG. 8C, the contents of the high register CH are circularly rotated right one location. The contents of the low register CL are circularly rotated right two locations. The contents of the entire register CX are rotated left four locations. The contents of the low register CL are then rotated left four locations. After the contents are unscrambled register CH contains destination matrix row 1 and register CL contains destination matrix row 5. The unscrambling of the C register is accomplished, e.g., by causing processor 14 to execute the following assembly language instructions.

```
ROR CH,1
ROR CL,2
ROL CX,4
ROL CL,4
```

After the contents of the B register are unscrambled, the unscramble register step unscrambles the D register. More specifically, referring to FIG. 8D, the contents of the low register DL are circularly rotated right one location. The contents of the entire register DX are circularly rotated left four locations. The contents of the low register DL are then rotated left four locations. After the contents are unscrambled register DH contains destination matrix row 0 and register DL contains destination matrix row 4. The unscrambling of the D register is accomplished, e.g., by causing processor 14 to execute the following assembly language instructions.

```
ROR DL,1
ROL DX,4
ROL DL,4
```

After the translation is complete, then the rows of the destination matrix are written into the correct location in video memory of video controller 18.

OTHER EMBODIMENTS

Other embodiments are within the following claims.

For example, while in the preferred embodiment, the example instructions are shown as assembly language instructions, the invention contemplates the use of any suitable programming language which provide the same functionality.

Additionally, for example, while the preferred embodiment is shown implemented using software, the invention contemplates the use of specifically designed circuitry, such as application specific integrated circuits (ASICs) to achieve the same functionality.

Additionally, for example, while the preferred embodiment is shown implemented with 8×8 pixel matrices, the invention contemplates pixel matrices of any size.

What is claimed is:

1. A method for rotating a source pixel matrix to provide a rotated destination matrix, the method operating on a computer system, the computer system including a processor, a memory and a temporary storage portion, the temporary storage portion including a plurality of rows, each row including a plurality of storage locations, the method comprising loading a first set of rows of the temporary storage portion with a lower portion of the source pixel matrix, loading a second set of rows of the temporary storage portion with an upper portion of the source pixel matrix, skewing the source pixel matrix loaded in first and second sets of rows to provide a skewed pixel matrix, alternately rotating selected portions of the skewed pixel matrix stored in selected rows of the first and second sets of rows horizontally and vertically to provide a rotated pixel matrix, and unscrambling the rotated pixel matrix to provide the rotated destination matrix.

2. The method of claim 1 wherein the temporary storage portion includes a plurality of registers, each register corresponding to one of the plurality of rows.

3. The method of claim 1 wherein the temporary storage portion includes a plurality of registers, each register including a high register portion and a low register portion, each high register portion and low register portion corresponding to one of the plurality of rows, and the lower portion of the source pixel matrix is loaded into the low register portion of each register, and the upper portion of the source pixel matrix is loaded into the high register portion of each register.

4. The method of claim 3 wherein the skewing step includes skewing one of the lower portion of the source pixel matrix and the upper portion of the source pixel matrix clockwise, and skewing another of the lower portion of the source pixel matrix and the upper portion of the source pixel matrix counter clockwise.

5. The method of claim 3 wherein the rotating step further includes rotating the high register portion and low register portion of each register horizontally, and rotating the high register portion of the plurality of registers vertically.

6. The method of claim 5 wherein the rotating the high register portion and low register portion step rotates the contents of each register left one location.

7. The method of claim 1 wherein the alternately rotating step is performed a predetermined number of times, the predetermined number of times being related to the size of the source pixel matrix.

8. The method of claim 7 wherein the source pixel matrix is eight pixels wide and the predetermined number of times is eight.

9. The method of claim 1 further comprising reordering the upper portion of the source pixel matrix to facilitate the unscrambling step.

10. The method of claim 9 wherein the reordering step is performed when the upper portion of the source pixel matrix is loaded into the second set of rows of the temporary storage portion.

11. A system for rotating a source pixel matrix to provide a rotated destination matrix, the system on a computer system, the computer system including a processor and a temporary storage portion, the temporary storage portion including a plurality of rows, each row including a plurality of storage locations, the system comprising a non-volatile computer readable memory, the non-volatile computer readable memory including means for loading a first set of rows of the temporary storage portion with a lower portion of the source pixel matrix, means for loading a second set of rows of the temporary storage portion with an upper portion of the source pixel matrix, means for skewing the source pixel matrix loaded in first and second sets of rows to provide a skewed pixel matrix, means for alternately rotating selected portions of the skewed pixel matrix stored in selected rows of the first and second sets of rows horizontally and vertically to provide a rotated pixel matrix, and means for unscrambling the rotated pixel matrix to provide the rotated destination matrix.

12. The system of claim 11 wherein the temporary storage portion includes a plurality of registers, each register corresponding to one of the plurality of rows.

13. The system of claim 11 wherein the temporary storage portion includes a plurality of registers, each register including a high register portion and a low register portion, each high register portion and low register portion corresponding to one of the plurality of rows, and the lower portion of the source pixel matrix is loaded into the low register portion of each register, and the upper portion of the source pixel matrix is loaded into the high register portion of each register.

14. The system of claim 13 wherein the means for skewing includes means for skewing one of the lower portion of the source pixel matrix and the upper portion of the source pixel matrix clockwise, and means for skewing another of the lower portion of the source pixel matrix and the upper portion of the source pixel matrix counter clockwise.

15. The system of claim 13 wherein the means for rotating further includes means for rotating the high register portion and low register portion of each register horizontally, and means for rotating the high register portion of the plurality of registers vertically.

16. The system of claim 15 wherein the means for rotating the high register portion and low register portion step rotates the contents of each register left one location.

17. The system of claim 11 wherein the means for alternately rotating performs a predetermined number of rotations, the predetermined number of rotations being related to the size of the source pixel matrix.

18. The system of claim 17 wherein the source pixel matrix is eight pixels wide and the predetermined number of rotations is eight.

19. The system of claim 11 further comprising means for reordering the upper portion of the source pixel matrix to facilitate the means for unscrambling.

20. The system of claim 19 wherein the means for reordering reorders the upper portion of the source pixel matrix when the upper portion of the source pixel matrix is loaded into the second set of rows of the temporary storage portion.

* * * * *